L. BENSON.
DISH WASHING MACHINE.
APPLICATION FILED AUG. 8, 1913.

1,218,620.

Patented Mar. 13, 1917.
2 SHEETS—SHEET 2.

Witnesses
G. M. Spring.
C. H. Crawford.

Inventor
Lawrence Benson,
By Richard Bowen,
his Attorney

UNITED STATES PATENT OFFICE.

LAWRENCE BENSON, OF SPOKANE, WASHINGTON.

DISH-WASHING MACHINE.

1,218,620.                Specification of Letters Patent.    Patented Mar. 13, 1917.

Application filed August 8, 1913. Serial No. 783,792.

*To all whom it may concern:*

Be it known that I, LAWRENCE BENSON, a citizen of the United States, residing at Spokane, in the county of Spokane and State of Washington, have invented certain new and useful Improvements in Dish-Washing Machines, of which the following is a specification.

One of the objects of this invention is to provide a dish washing machine with dish supporting means or trays formed in such a manner as to permit the dishes to be loosely disposed thereon so as to avoid the necessity of any kind of attaching means to anchor the dishes.

A further object of my invention is to provide dish supporting means of this character which will permit of the projection thereon of a cleansing liquid from a variety of directions.

A further object of my invention is to provide a washing machine in which dishes of the bowl or tureen type may be effectively washed, and in this connection, the invention provides for stationary means adapted to cleanse the interior portions of dishes of this character, such stationary means being so disposed with respect to the movable parts so as to present the exterior surfaces of this type of dish for projection thereon by the cleansing fluid used on the dishes which are in motion.

The device of my invention presents other features of novelty which will be more fully described by the accompanying drawings and which will be more particularly pointed out in the appended claim.

Figure 1:
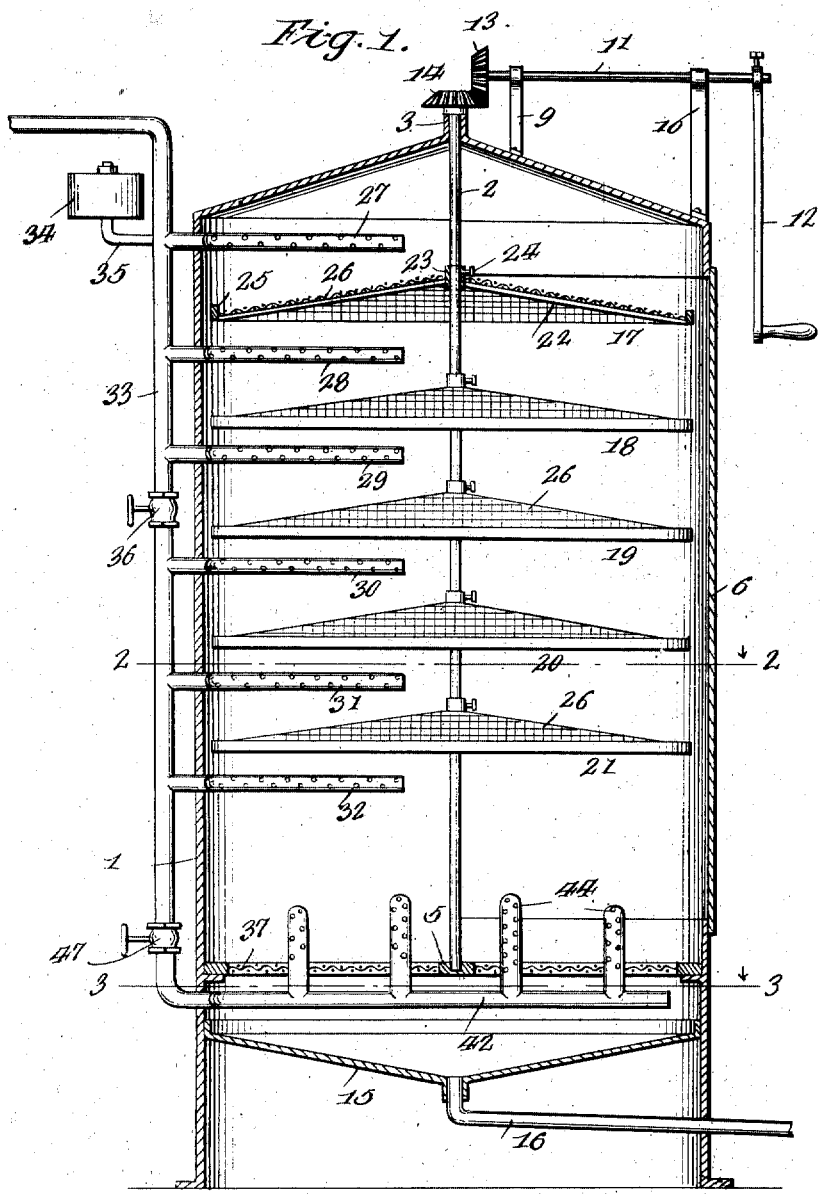
Figure 1, is a vertical sectional view of a dish washing machine embodying one form of my invention.

As illustrated, 1, designates a casing which may be of cylindrical form, and in which a vertically disposed operating shaft 2, is mounted. The shaft 2, may be journaled at its upper end in a suitable bearing 3, formed on top 4, of the casing 1. A lower bearing 5, is provided for the shaft 2, and may be disposed on the lower dish carrying tray, if desired. In order to afford access to the interior of the casing 1, I provide the same with a door 6, which may be hinged at 7, and secured by any suitable fastening device 8. On the top 4, I provide bearings 9 and 10, in which a crank shaft 11, is journaled. A crank 12, is mounted on one end of said shaft, and the other end of said shaft is geared to the operating shaft 2, by bevel gears 13 and 14.

Near the lower end of the casing 1, I provide a drainage bottom 15, which directs to a drain pipe 16, adapted for connection with the sewer or any other convenient receiving means for the water.

Upon the operating shaft 2, and preferably in superposed, spaced, vertical relation, I mount a plurality of dish supporting trays, all of which are the same in construction and operation, and only one of which need be described in detail. The trays are indicated at 17, 18, 19, 20, and 21, and referring to tray 17, it will be seen that the same consists of supporting frame bars 22, mounted upon a hub 23, which latter is secured to the shaft 2, by means such as a set screw 24. The frame members 22, are inclined downwardly and outwardly from the hub 23, to periphery of the tray, at which point I provide an upstanding rim 25. In the present construction, the trays are substantially conical and circular in form, and the tray frame, just described, serves as a support for a reticulated covering 26, on which the dishes are adapted to be disposed.

The incline of the trays, together with centrifugal action resulting from the operation thereof, will serve to shift the dishes outwardly against the rim 25, and when the tray is substantially covered with the dishes, especially plates and saucers of different sizes, they will interlock and be held in engagement with the edge of the rim, in a most effective manner. Of course these trays will not be rotated at such speed as to cause the centrifugal action to throw the dishes outwardly over the rim 25.

Figure 2:
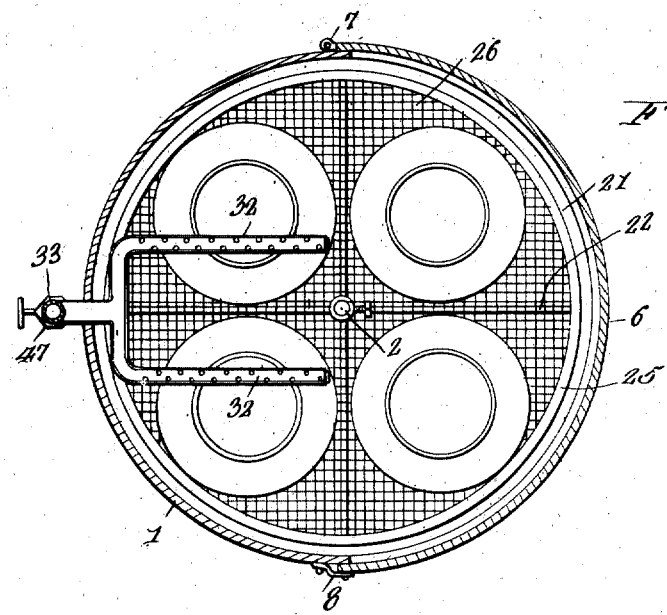
Fig. 2, is a sectional view thereof on line 2—2 of Fig. 1.
Figure 3:
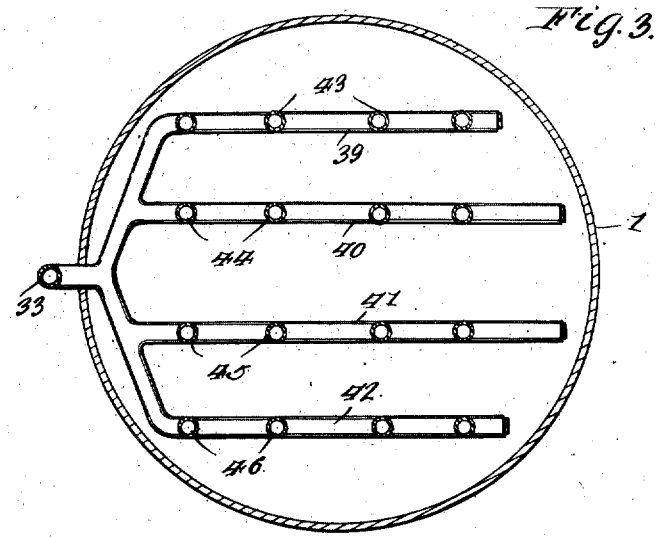
Fig. 3, is a sectional view thereof on line 3—3 of Fig. 1.

Above and below each tray are disposed perforated pipes 27, 28, 29, 30, 31, and 32, and the pipes may be branched in U-shaped form, as indicated in Fig. 2. I preferably arrange the perforated pipes horizontally so that they will direct the streams of cleansing liquid angularly to the planes of the dishes on the inclined trays, both as regards the upper and lower faces of the dishes. It will thus be seen that by reason of the inclination of the dishes with respect to the streams projected thereon, I not only insure a cleansing action throughout the area of the dishes, but I avoid the necessity of projecting the cleansing liquid thereon throughout their travel or rotation, and this, by reason of the effective action of the streams of the cleansing liquid as hereinbefore stated.

The pipes 27 to 32 are connected to a manifold or main supply pipe 33, which latter may be connected with any suitable source of supply of hot water. If it is desired to supply soap in liquid form I provide a cup 34, which may be connected by a pipe 35 to pipe 33.

In case it is only desired to use the upper trays 17 and 18, I provide a valve 36, on the pipe 33, which may be closed to cut off the supply of water from the pipes 31 and 32. Furthermore, if the pressure is such that a quantity of the water is passing through the pipes 27, 28, and 29, I may partially close the valve 36, and rely upon the water descending from the upper pipes 27, 28 and 29, to cleanse the dishes on the lower trays 19, 20, and 21, such descending liquid coöperating with the streams discharged from the pipes 30, 31, and 32.

In order to cleanse relatively large bowls and tureens, etc., I provide a tray 37, which may be disposed upon a flange support 38, near the bottom of the casing 1. The pipe 33, terminates beneath the tray 37, and is provided with branches 39, 40, 41 and 42, each of the said branches having a plurality of perforated extensions or roses 43, 44, 45, and 46, respectively, which project upwardly through the tray 37, in a manner to extend into the hollow portion of a bowl or tureen. The exterior portions of the dishes disposed on the lower tray will be cleansed by the water in its descent from the several uppermost trays.

A valve 47, is provided in the pipe 33 to cut off the supply of water to the branches 39 to 42, when the tray 37 is not in use.

While I have herein shown and described one specific embodiment of my invention, I do not wish to be limited thereto except for such limitations as the claim may import.

I claim:

In a dish washing machine, a container, a foraminated rack removably arranged in said container, a bearing fixedly mounted centrally of said rack, a vertical shaft in the container having its lower end journaled in said bearing and its upper end journaled in the container top, a plurality of foraminated trays, adjustably secured in superposed relation to said shaft, a manifold pipe having branches extending therefrom into proximity of the rack and trays, a detergent container affixed to and communicating with said manifold at a point adjacent the top of the container, cut-off means arranged in the manifold for controlling the passage of cleansing fluid through the same and to certain of said branches, and means intergeared with said shaft for rotating the same.

In testimony whereof I have affixed my signature in presence of two witnesses.

LAWRENCE BENSON.

Witnesses:
FORCHIN HEDGER,
FRANK YUSE.